Patented Oct. 17, 1939

2,176,854

UNITED STATES PATENT OFFICE 2,176,854

COLORED FIBERBOARD

Joseph W. Gill, Elmhurst, Ill., assignor to United States Gypsum Company, Chicago, Ill., a corporation of Illinois No Drawing. Application February 3, 1937, Serial No. 123,845

3 Claims. (Cl. 92—21)

This invention relates to a colored organic material. It is especially applicable to vegetable fiber insulation board having a tendency to change in color on exposure to light.

Insulating board which is comprised substantially of an organic material such as wood, sugarcane, straw, etc., fibers will upon a relatively short exposure to light tend to darken and yellow. Of course, it is not known definitely what occurs within but in case of highly purified or refined woody fibers, this action is arrested to an appreciable degree.

In the preparation of woody fibers particularly for use in insulating fiber wallboard, it obviously would be too costly to refine sufficiently the woody fiber in order to arrest the yellowing or darkening action. However, by my invention I am able to obtain a fibrous wallboard product which is not only substantially unchangeable in regard to color, but also is economical to produce.

Therefore, it is an object of my invention to provide a fiber insulation wallboard which remains substantially unchanged in appearance after prolonged exposure to either natural or artificial light.

A still further object of my invention is to provide a process to produce a fiber insulation wallboard suitable for building purposes which will remain substantially unchanged on prolonged exposure to light.

A further object of my invention is to provide a process of producing a colored organic fibrous material which will remain substantially unchanged upon prolonged exposure to light; also to improve colored fiberboards and their process of manufacture in other respects hereinafter specified and claimed.

To accomplish my object, I use certain dyes, coloring matter, or combinations thereof if desired, which fade in their natural color characteristics at approximately the same rate that the natural dyes present in the organic material darken or yellow on exposure to artificial or natural light. In my formula, therefore, I incorporate a quantity of coloring matter or dye of a nonfast color character which will color the material to that shade which the undyed organic material or fibrous product would assume on exposure to light without the presence of the said coloring matter. Of course, the desired ultimate shade in the product may be obtained by the simultaneous incorporation with the nonfast coloring matter, of a light fast coloring matter in such quantities as required.

Thus, I am able to obtain a permanent color effect in the finished organic product through the combined effect of the individual nonlight-fast, coloring matter, either added or naturally present in the fibrous material, since the cumulative effect of all color component changes remains constant.

As an illustration of my invention but not as a limitation, for obviously the principle underlying my invention can be applied with equal effectiveness to other products, I shall first apply it to the manufacture of insulating wallboard produced from cottonwood fiber. It is understood that other fibers can be used, such as spruce, poplar, and others. In such cases, it may be necessary, to vary the proportions of coloring materials in order to obtain the desired ultimate shade.

It is obvious that with the addition of light-fast color dyes and pigments, an ultimate permanent shade can be obtained although some or all of the color components subject to the action of light are for a time in their transitory stages. I may, for example, use such fading dyes which compensate for the darkening and yellowing action of organic material, as Brilliant Paper Yellow and Brilliant Crocein FL. As an example of light-fast coloring matter, artificial or earth pigments such as red oxide of iron, carbon black, sienna, umbers, etc., may also be used. In addition, there are also a number of dyes and lakes which are markedly resistant to fading by light.

The methods of fiberboard manufacture are well known. In utilizing my invention in the manufacture of fiberboard or products, I prefer to add, as a matter of economy and convenience, the coloring matter dissolved or suspended in water at approximately the same point that the size is added. The pH of the stock is adjusted to the optimum condition, generally about 4.5 for the dyes used in my invention. Other dyes may require other hydrogen ion concentrations. After the coloring matter is incorporated into the stock, the board is formed and treated in the conventional manner.

In the production of a colored insulation product I use the following ingredients:

|  | Color index No. | Tan | Gray |
|---|---|---|---|
| Fiber (cottonwood) | | 1,000 pounds | 1,000 pounds |
| Size | | 5–15 pounds | 5–15 pounds. |
| Dyes: | | | |
| Brilliant Paper Yellow | 364 | 8 ounces | 6½ ounces. |
| Brilliant Crocein FL | 252 | 5½ ounces | 5 ounces. |
| Nigrosine WEB-FDR | 865 | 2½ ounces | 4 ounces. |
| Alum (to pH 4–5) | | 20–40 pounds | 20–40 pounds |
| Pigments: | | | |
| Red Oxide RL | 543 | 15 pounds | None. |
| Mapico Red | 110 | None | 4 pounds. |
| Charon Black | | 3 pounds | None. |
| B.&S. Colloidal Black M | | None | 3½ pounds. |

The Brilliant Paper Yellow is a standard type of direct yellow dye with a color index of No. 364. The Nigrosine is also a standard type of dye with a color index of No. 865. The Brilliant Crocein FL is an acid dyestuff with a color index of No. 252. B. & S. Colloidal Black M is a form of carbon black having a bluish undertone while "Charon" black is a lampblack carbon pigment having a brownish undertone. Red Oxide RL 543 and "Mapico" Red 110 are iron oxide pigments having slightly different shades.

The actual amount of dyes and pigments used depends to a great degree upon the intensity and rapidity of the darkening or yellowing occurring in the organic material. It, therefore, is apparent that the amounts used will vary considerably. Furthermore, other species of woody material, like pine for instance, will have a tendency to yellow more quickly than a poplar. It is obvious that though the principle underlying my invention can be applied with equal effectiveness to other organic products exhibiting, like cottonwood, the same phenomena upon exposure to light, it is necessary by trial to determine the exact amounts of dyes and pigments needed to obtain the desired ultimate shade.

I wish to state in conclusion that while the example described represents one practical embodiment of my invention, I do not wish to limit myself precisely to these details or to these products, since manifestly the same may be considerably varied without departing from the spirit of the invention as defined in the appended claims.

Having thus described my invention, I claim as new and desire to secure by Letters Patent:

1. A tan colored fibrous board comprising essentially the following ingredients in substantially the proportions named:

| | | |
|---|---|---|
| Vegetable fibers | pounds | 1000 |
| Rosin size | do | 5–15 |
| Brilliant paper yellow dye | ounces | 8 |
| Brilliant crocein dye | do | 5½ |
| Nigrosine | do | 2½ |
| Alum | pounds | 20–40 |
| Red oxide | do | 15 |
| Carbon black | do | 3 |

2. A gray colored fibrous board comprising essentially the following ingredients in substantially the proportions named:

| | | |
|---|---|---|
| Vegetable fibers | pounds | 1000 |
| Rosin size | do | 5–15 |
| Brilliant paper yellow | ounces | 6½ |
| Brilliant crocein | do | 5 |
| Nigrosine | do | 4 |
| Alum | pounds | 20–40 |
| Red oxide of iron | do | 4 |
| Colloidal black | do | 3½ |

3. A colored fibrous board including essentially the following ingredients:

| | | |
|---|---|---|
| Vegetable fibers | pounds | 1000 |
| Size | do | 5–15 |
| Brilliant paper yellow dye | ounces | 6½–8 |
| Brilliant crocein dye | do | 5–5½ |
| Nigrosine | do | 2½–4 |
| Red oxide of iron | pounds | 4–15 |
| Carbon black | do | 3–3½ |
| Alum | do | 20–40 |

JOSEPH W. GILL.